Patented Aug. 27, 1935

2,012,279

UNITED STATES PATENT OFFICE 2,012,279

GASPROOF VARNISH AND METHOD OF MAKING SAME

Julius Hyman, Chicago, Ill., assignor to Velsicol Corporation, Chicago, Ill., a corporation of Illinois No Drawing. Application January 28, 1933, Serial No. 654,110

4 Claims. (Cl. 134—26)

This invention relates to improvements in varnishes, dried films of which are characterized by the absence of such defects as frosting and crows-footing due to the deleterious action of fumes upon the drying films, and to a processes of making said varnishes. More specifically, the invention relates to varnishes comprising tung oil or its equivalent wherein the tung oil, although bodied at a relatively low temperature, is prevented from causing the drying varnish film to exhibit the defect of gas-checking, by the introduction of a gas-proofing agent.

Bodied tung oil owes its prominent place in the varnish industry to its ability, on drying, to form films which are highly resistant to the action of water. The bodying of tung oil is carried on by heat, the bodying temperature being from about 300° F., to about 600° F., or by blowing with air at lower temperatures. If, however, pure tung oil is bodied below a temperature of about 575° F., a film of the oil, on drying, may under certain conditions exhibit a serious defect known as "gas-checking." Gas-checking of a tung oil varnish film is characterized by the formation of numerous long, irregularly crossing ridges, a phenomenon commonly referred to as "crows-footing", and also by the formation of a characteristic dulling of the film, known as "frosting." The phenomenon of gas-checking is usually occasioned by the action of the fumes of burning materials on the moist film surface of improperly bodied tung oil varnishes.

It has heretofore been proposed to gas-proof tung oil varnishes by cooking the oil to a temperature of 575° F., or higher. This method, however, leads to various inherent detrimental defects among which may be mentioned that the tung oil unless very carefully handled is quite apt to over-body; that is, to show a rubbery string, or actually to jell in the kettles. Tung oil possessing a rubbery string makes very inferior varnishes, whereas jelled tung oil cannot be used at all in varnish making. Moreover, the high heat treatment is distinctly detrimental to the waterproofing qualities of the tung oil.

The introduction of oil soluble phenol-formaldehyde resins has made it possible to produce gasproof tung oil varnishes at kettle temperatures radically lower than 575° F. These resins, however, are comparatively expensive and, therefore, cannot be used profitably in the manufacture of many kinds of varnish.

As a feature of my invention, I may body tung oil at relatively low temperatures and still obtain varnishes which are substantially gas-proof. To accomplish this end, various materials such as, mono-methyl-aniline, di-phenyl-guanidine, metaphenylenediamine, beta-naphthylamine, beta-thio-naphthol, aniline, thio-cresols, may be added to the bodied tung oil.

In general, all chemical compounds having no decidedly detrimental effect upon the varnish, and possessing amino, hydroxy, sulfhydro or mono-substituted amino radicals attached directly to a benzene or benzenoid nucleus and which are soluble in tung oil varnishes, have gasproofing properties providing they remain in the varnish film when drying. Compounds in this group have the general formula A-B-H, where A denotes a substituted or unsubstituted benzene or benzenoid nucleus and B denotes the groups NH, NR, or S, in which N is nitrogen, H is hydrogen, S is sulphur, and R is an organic group. In this formula both A and H are connected with B by single valences, B being attached directly to a carbon atom in the nucleus.

The amount of these substances necessary to gas-proof tung oil varnishes may vary with the amount and nature of the constituents other than tung oil in the varnishes, as well as the degree of heat treatment to which the tung oil has been subjected and the amount and nature of the metallic drier present. It should seldom, if ever, be necessary to add more than one-sixth the weight of the tung oil present although less than 5%, by weight, of gas-proofing agent, relative to tung oil, may be sufficient.

In carrying out my invention, the tung oil is preferably bodied alone, prior to the addition of the gas-proofing agent and prior to the addition of any resins, etc. The bodying may be carried out at temperatures as low as 425° F., or even lower. The oil when properly bodied shows a decided string but has not reached the jell stage. The gas-proofing agent may thereupon be dissolved in the bodied tung oil at any desired temperature where solution takes place. If desired, the gas-proofing agent may be dissolved in some suitable solvent and added to the bodied tung oil, or to the varnish incorporating said tung oil at any desired temperature. Whatever resinous materials are added should preferably be added after the tung oil has attained the proper body.

As an example, pure Hankow tung oil may be bodied at 425° F., until just before the point where a string of cooled oil indicates by its rubbery nature that "livering" has begun. This period is usually in the neighborhood of about 105 minutes. The oil may then be rapidly cooled by external application of water or otherwise until the temperature has reached approximately 300° F., when 5%, by weight, of thio-beta-naphthol is added, and brought into solution by stirring. When cool, the bodied and treated oil may be mixed with a drier which may comprise cobalt metal in soap combination dissolved in naphtha. The total quantity of cobalt metal used may be 0.25% of the weight of the tung oil present. The oil may then be further diluted with, say 150% V. M. P. naphtha, and tested for gas-proofness according to the method given in the circular of the Bureau of Standards No. 117, second edition, pages 5 and 6. The film formed will not show the characteristic crows-footing or frosting.

As another example of my invention, 30 parts of tung oil may be bodied to a suitable string at approximately 425° F. Thereupon one part of pure beta-naphthylamine is added and the oil cooled to 150° F., whereupon 28 parts of a 50% ester gum solution in xylol and three-fourths part of cobalt linoleate dissolved in 30 parts of an equal mixture of V. M. P. naphtha and xylol, are added. The varnish thus formed may be thoroughly mixed and when utilized has been found to dry rapidly and to be gas-proof.

As a further example of my invention, 100 parts of wood oil bodied properly at 425° F. is mixed with five parts of meta-thio-cresol at 250° F. To this mixture may be added 100 parts of mineral drying oil of deep reddish-brown color, possessing an iodine number of about 175 and a Saybolt Universal viscosity of around 172 at 100° F. Three parts of cobalt linoleate dissolved in 100 parts by weight of light naphtha may finally be added and the mixture stirred.

It is to be understood, of course, that the above examples are given merely for the purpose of illustrating my invention and are not to be construed as limitations thereon. It is also to be understood that my invention may be applicable to blown tung oil.

I claim as my invention:

1. A protective coating composition containing tung oil, a drier, and a gas checking inhibitor selected from the group consisting of monomethyl aniline, diphenyl guanidine, metaphenylene diamine, beta naphthylamine, beta-thio-naphthol, aniline, and thio-cresols.

2. A protective coating composition comprising tung oil, a drier, and beta naphthylamine as an inhibitor of gas checking.

3. A protective coating composition comprising tung oil, a drier, and thio-beta-naphthol as an inhibitor of gas checking.

4. A protective coating composition comprising tung oil, a drier, and meta-thio-cresol as an inhibitor of gas checking.

JULIUS HYMAN.